United States Patent [19]
Lee

[11] Patent Number: 5,515,751
[45] Date of Patent: *May 14, 1996

[54] TIRE PUNCTURE REPAIR DEVICE

[76] Inventor: Meng-Chang Lee, Suite 1, 11F No. 95-8 Chang Ping Rd. Sec. 1, Taichung, Taiwan

[*] Notice: The term of this patent shall not extend beyond the expiration date of Pat. No. 5,461,945.

[21] Appl. No.: 519,181

[22] Filed: Aug. 25, 1995

Related U.S. Application Data

[63] Continuation of Ser. No. 300,916, Sep. 6, 1994, abandoned.

[51] Int. Cl.⁶ .................................................. B29C 73/08
[52] U.S. Cl. ........................................................ 81/15.7
[58] Field of Search ..................... 81/15.2, 15.7

[56] References Cited

U.S. PATENT DOCUMENTS

| | | | |
|---|---|---|---|
| 743,963 | 11/1903 | Weigele | 81/15.7 |
| 1,594,031 | 7/1926 | Young | 81/15.7 |
| 3,837,243 | 9/1974 | Mays | 81/15.7 |
| 4,205,565 | 6/1980 | Smith | 81/15.7 |

*Primary Examiner*—James G. Smith

[57] ABSTRACT

A tire puncture repair deivce comprises a hollow shank with a notched free end and an attached handle, a threaded conical penetrater having lugs on the bottom thereof, and an elongate resilient obturator fixed on one end to the bottom of the penetrater. The obturater is insertable within the bore of the shank wherein the lugs of the penetrater engages the notches thereon so as to rotate therewith. The penetrater and obturater are held in place by a spring loaded catch lever hingedly attached to the shank which engages a recess in the obturater through an opening in the shank. After penetration of a puncture the obturater is released by depressing the lever, and then ejected by moving a slide member, having a piston in abutment with the free end of the obturater, forward. The shank is subsequently extracted from the tire wall leaving the obturater therein to seal the puncture.

13 Claims, 10 Drawing Sheets

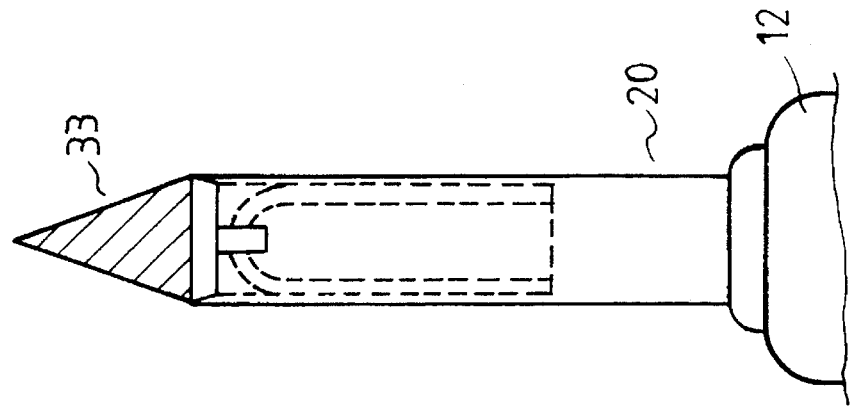
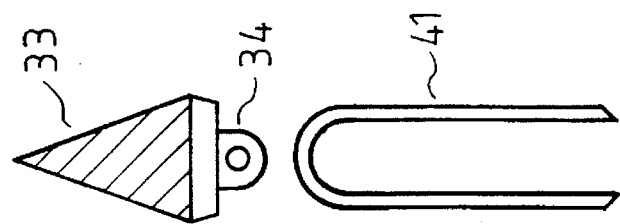
FIG. 2A                    FIG. 2
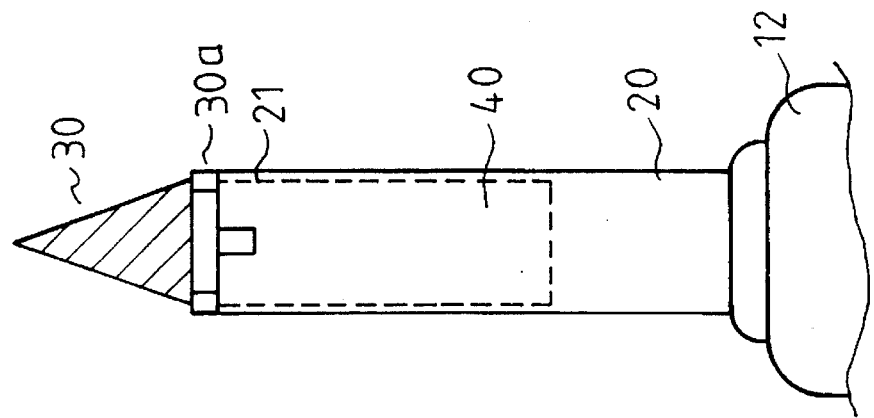
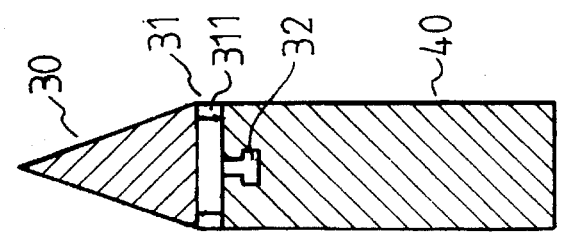
FIG. 1A                    FIG. 1

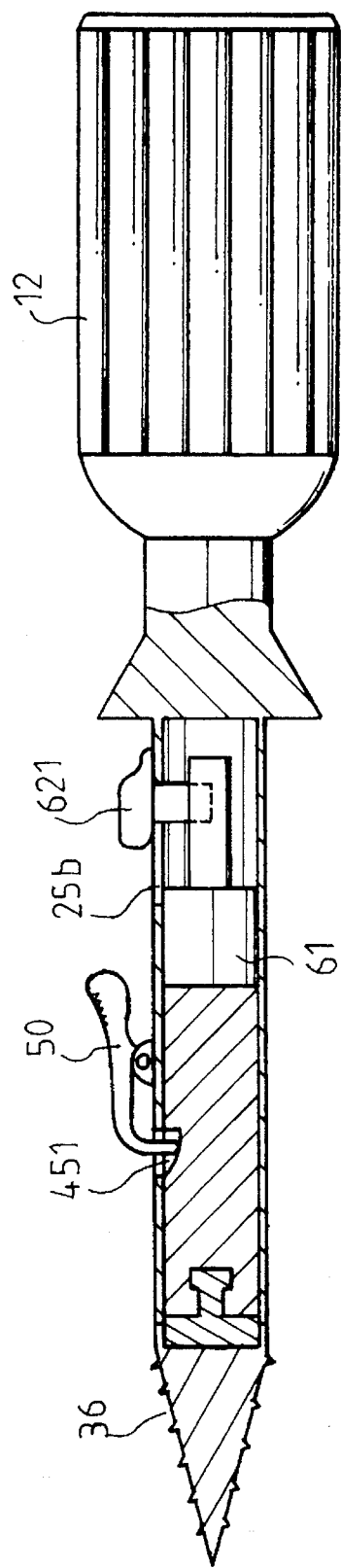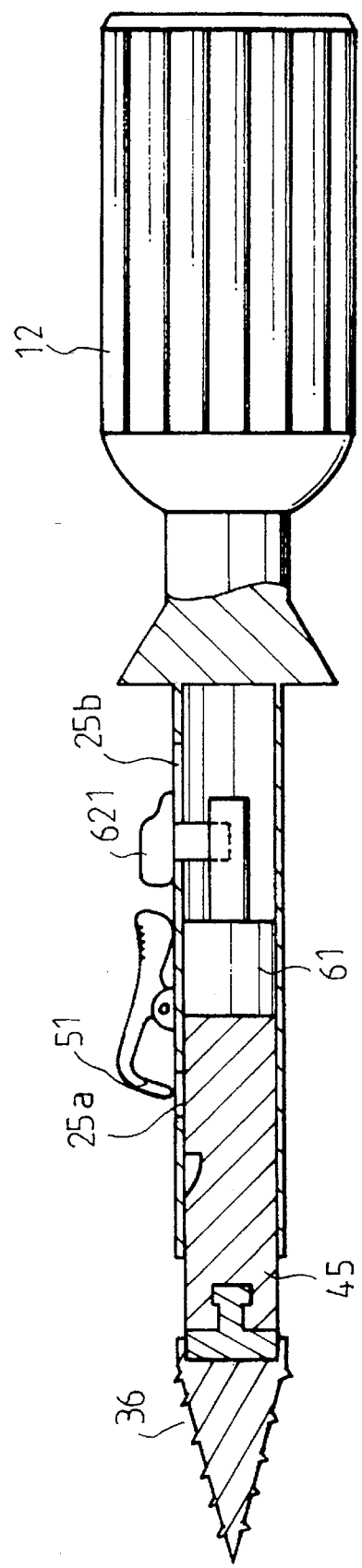

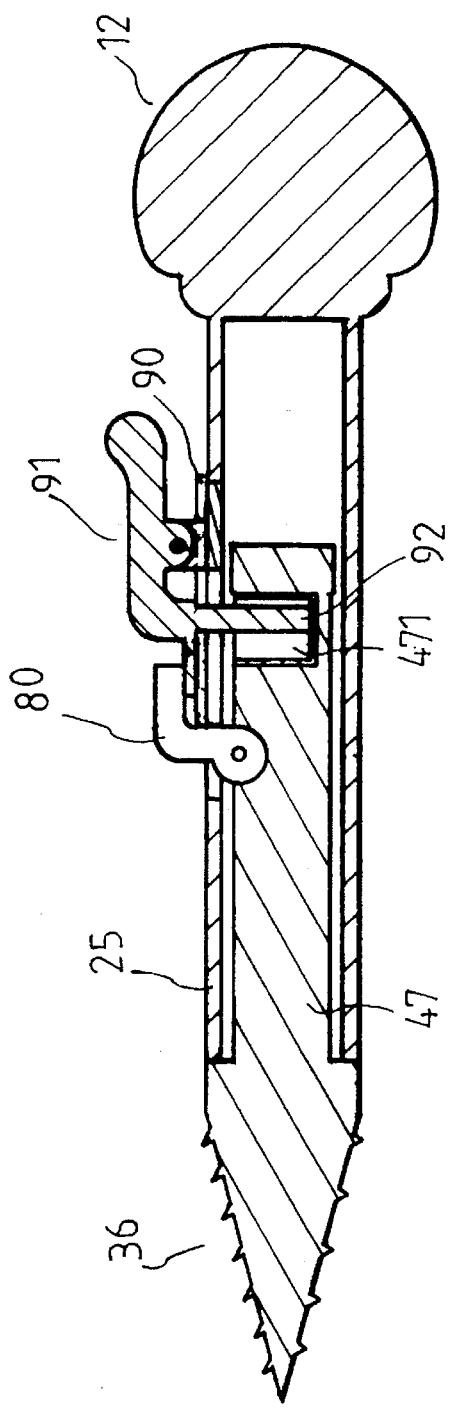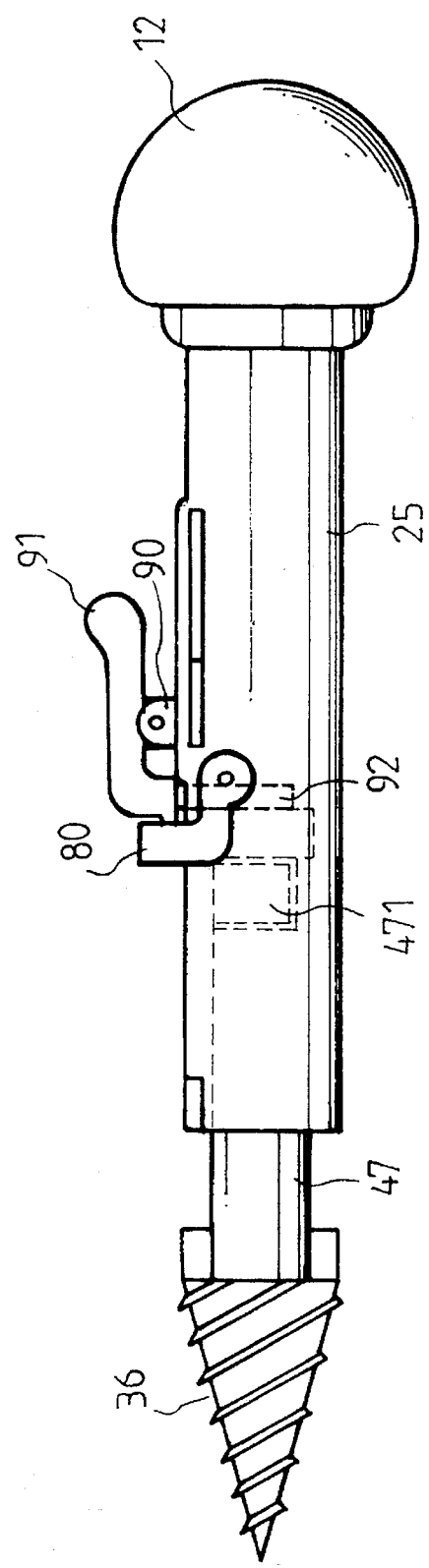

TIRE PUNCTURE REPAIR DEVICE

This application is a continuation of Ser. No. 08/300,916, filed Sep. 6, 1994, abandoned.

BACKGROUND OF THE INVENTION

The present invention relates to a tire puncture repair device, and more particularly to a portable and manually operated tire puncture repair device which inserts a resilient obturating member through a tire puncture.

The instant application is related to U.S. Pat. No. 5,461,945 for a similar device by the instant inventor.

Conventional tire puncture techniques generally involve an elongate resilient sealing member which is grasped on the end of a sharp implement which is subsequently impaled through a puncture aperture on a tire using considerable strength wherein the sealing member is partially carried therethrough. The implement is usually provided with a slit or other aperture whereby the sealing member is retained within the tire by the large compressive and blocking forces provided thereby when the implement is extracted from the tire. Though functional, the more conventional tire puncture techniques are generally cumbersome requiring a relatively large degree of physical exertion. Further, the large insertion forces often require that the tire be pre-inflated or the associated wheel removed from the vehicle.

The tire repair device of the present invention provides a much more efficient tool which requires relatively low insertion forces and which can be operated by unskilled personnel without undue manipulations.

SUMMARY OF THE PRESENT INVENTION

The tire puncture repair device of the present invention generally comprises a shank member with an attached handle having a bore in the free end thereof, a threaded conical penetrater member attachable to the free end of the shank member for rotation therewith, and an elongate resilient obturater member fixed to the bottom of the conical penetrater. The obturater member is disposed within the bore of the shank member when the penetrater member is mounted thereon. The penetrater member and shank member are rotatingly bored through a tire puncture afterwhich the shank member is extracted leaving the penetrater member within the tire's interior and the obturater member within the puncture to effect a seal.

The tire puncture repair device of the present invention has as a main object to provide a device as characterized which requires much reduced user exertion and which facilitates tire repair by non professionals.

A further object of the present invention is to provide a tire puncture repair device providing a more efficient and reliable seal.

For a more thorough understanding of the present invention reference should be made to a detailed description of a preferred embodiment thereof, provided below along with accompanying drawings.

BRIEF DESCRIPTION OF THE DRAWINGS

FIGS. 1 and 1A are the side views of a first embodiment of the tire puncture repair device of the present invention.

FIGS. 2 and 2A are the side views of a second embodiment of the tire puncture repair device of the present invention.

FIG. 5 is a side sectional view of the embodiment of FIG. 4 wherein a penetrater and attached obturater are in position within a shank ready for insertion through a tire puncture.

FIG. 6 is a side sectional view of the embodiment of FIG. 4 wherein the penetrater and obturater have been disposed forward relative to the shank.

FIG. 13 is a side sectional view of the embodiment of FIG. 11 wherein the obturater has been elongated rearwards and is held in place to secure the obturater and attached penetrater in position.

FIG. 14 is a side sectional view of the embodiment of FIG. 11 wherein the penetrater and obturater have been displaced forward relative to the shank.

DETAILED DESCRIPTION OF THE PREFERRED EMBODIMENTS

Figure 3:
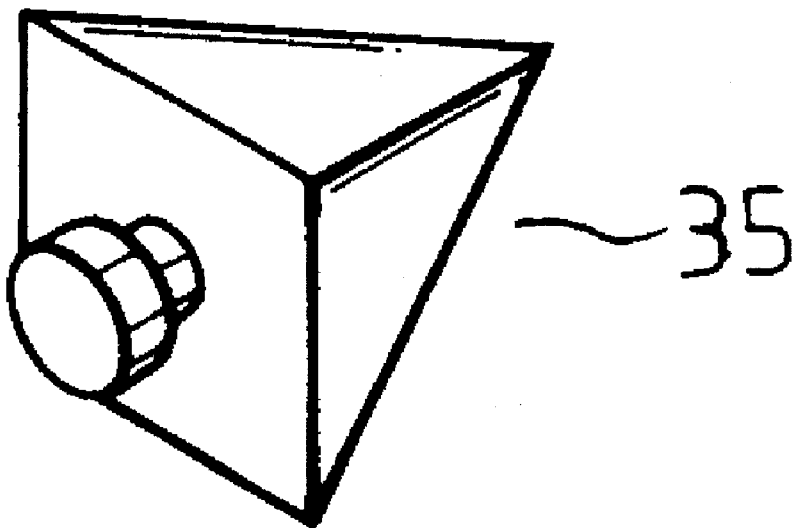
FIG. 3 is a perspective view of a penetrater member of a third embodiment of the present invention.

Referring to FIGS. 1 and 1A of the drawings, s first embodiment of the present invention comprises a handle 12, a hollow cylindrical shank 20, and a generally conical penetrater 30 with a depending obturater 40. The conical penetrater 30 has a spiral cutting thread formed thereon for boring through a puncture in a tire wall. The elongate cylindrical obturater 40 of a resilient synthetic material is integrally formed under the cylindrical bottom 31 of the penetrater 30 wherein a depending mushroom shaped lug 32 thereon is embedded within the upper end portion of the obturater 40. The penetrater 30 is mounted over the open end of the shank 20 when in use, whereat bottom 31 and obturater 40 are disposed within the central bore of the shank 20 which is of substantially the same diameter. A pair of axially aligned projections 311 around the periphery of bottom 31 engage cooperating notches 21 on the free end of the shank 20 when the penetrater 30 is mounted thereon so as to rotate therewith. The penetrater 30 has a maximum diameter slightly greater than the diameter of the shank 20 so as to define an overhanging rim 30a which aids the separation of the penetrater 30 from the end of the shank 20 during extraction from a tire wall.

In operation, the penetrater 30 is mounted on the shank 20 and then directed into a tire puncture while applying thrust to the handle 12 and rotating it in an appropriate direction, whereby the shank 20 led by the threaded penetrater 30 bores through to the tire's interior chamber. The shank 20 is subsequently pulled out of the tire wall wherein the penetrater 30 disengages from the shank 20 and remains in the tire's interior. The obturater 40 being attached to the penetrater 30 remains within the puncture and effectively seals off any air leakage. Any length of obturater 40 extending outward from the tire puncture is severed with an appropriate tool.

A second embodiment is shown in FIGS. 2 and 2A, which differs from the previous embodiment only in that separately attached obturater 41 is used in place of the integral obturater 40. The penetrater 33 has an eyelet 34 below the bottom thereof in place of the lug 32 of the previous embodiment throughwhich the elongate obturater 41 is threaded and folded in half thereabout. The folded obturater 41 is inserted into the bore of the shank 20 as in the previous embodiment and subsequent operation of the device is identical. The obturater 41 and penetrater 33 were previously disclosed in the above mentioned prior application by the instant inventor.

FIG. 3 shows a three sided pyramidal penetrater 35 employed in a third embodiment of the present invention. With this penetrater 35 a rotating insertion of the repair tool is not essential and allows a direct thrust insertion, as could be facilitated by a hammering tool.

Figure 4:
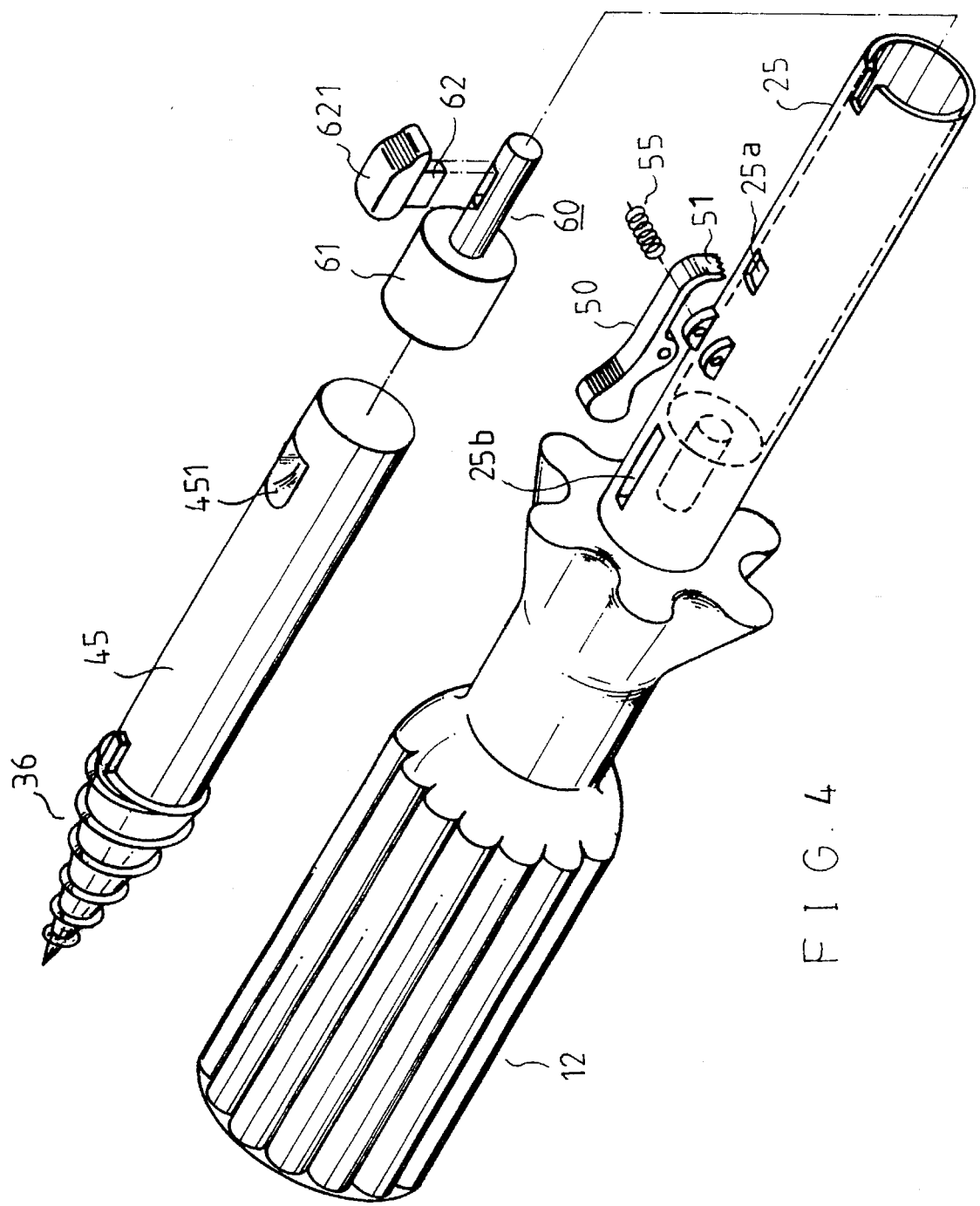
FIG. 4 is a perspective disassembled view of a fourth embodiment of the present invnetion.

Referring to FIGS. 4 to 6 of the drawings, a fourth embodiment of the present invnetion includes mechanism for securing a penetrater 36 to the shank 25 during insertion through a tire and also for releasing and ejecting the penetrater 36 after the tire wall has been penetrated. To releasably secure the penetrater 36 to the shank 25 during insertion an obturater 45 is provided with a generally saw tooth shaped retaining recess 451 near the distal end thereof from the penetrater 36. A lever 50 biased by a spring 55 is hingedly attached to the shank 25 which has an incised opening 25a at a predetermined position thereon. The opening 25a is in registry with the recess 451 of the obturater 45 when the latter is positioned within the shank 25 so that the penetrater 36 is mounted on the end thereof. The forward end of the lever 50 has a catch member 51 which is urged under the bias of the spring 55 through opening 25a so as to engage the recess 451 of an obturater 45, preventing separation of the penetrater 36 from the shank 25. After penetration of a tire wall has been accomplished the obturater 45 and penetrater 36 are released by manually depressing a rearward end of lever 50 so as to disengage the catch member 51 from the recess 451 on the obturater 45. For separating the penetrater 36 from the shank 25 and concomitantly exposing a forward portion of the obturater 45, a co-axial slide member 60 is provided within the shank 25. A piston 61 substantially the same diameter as the bore of the shank 25 is fixed to the forward end of the slide member 60 while a transverse arm 62 extends perpendicularly from a rear portion thereof through a slot 25b on the shank 25. The piston 61 is adjacent the free end of the obturater 45 when the slide member 60 is at its rearward limit. The penetrater 36 of equal diameter with the shank 25 is displaced therefrom by manually moving the slide member 60, via a protruding end 621 of the arm 62, to its forward limit, after first releasing the obturater 45, whereby piston 61 abuts the free end of obturater 45 and displaces it forward in the bore of the shank 25. During initial insertion of obturater 45 into shank 25 and the mounting of the penetrater 36 thereon the lever 50 is depressed so as to not obstruct the bore of the shank 25, and the slide member 60 is at the rearmost position.

Figure 7:
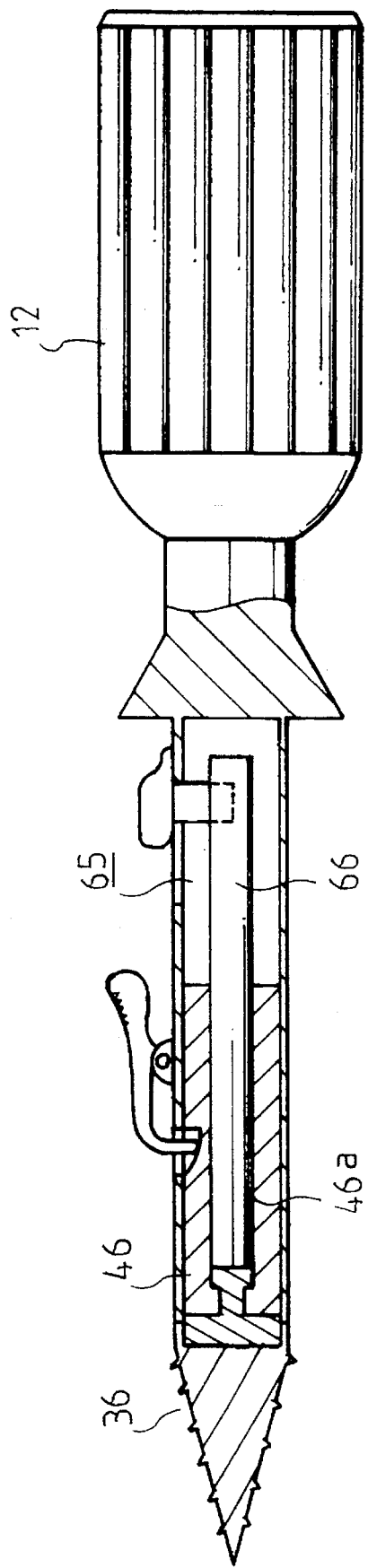
FIG. 7 is a side view of a fifth embodiment of the present invention

FIG. 7 shows a fifth embodiment of the present invention which differs from the prior embodiment only in that an obturater 46 includes a central bore 46a therein in communication with the bottom of the penetrater 36, and a slide member 65 has in lieu of the piston 61 a rod 66 which extends through the bore 46a. The obturater 46 and attached penetrater 36 are secured prior to penetration in the same menner whereas in this embodiment the rod 66 is slid forward in bore 46a and comes into abutment against the bottom of the penetrater 36 and carries it forward away from the end of the shank 25.

Figure 8:
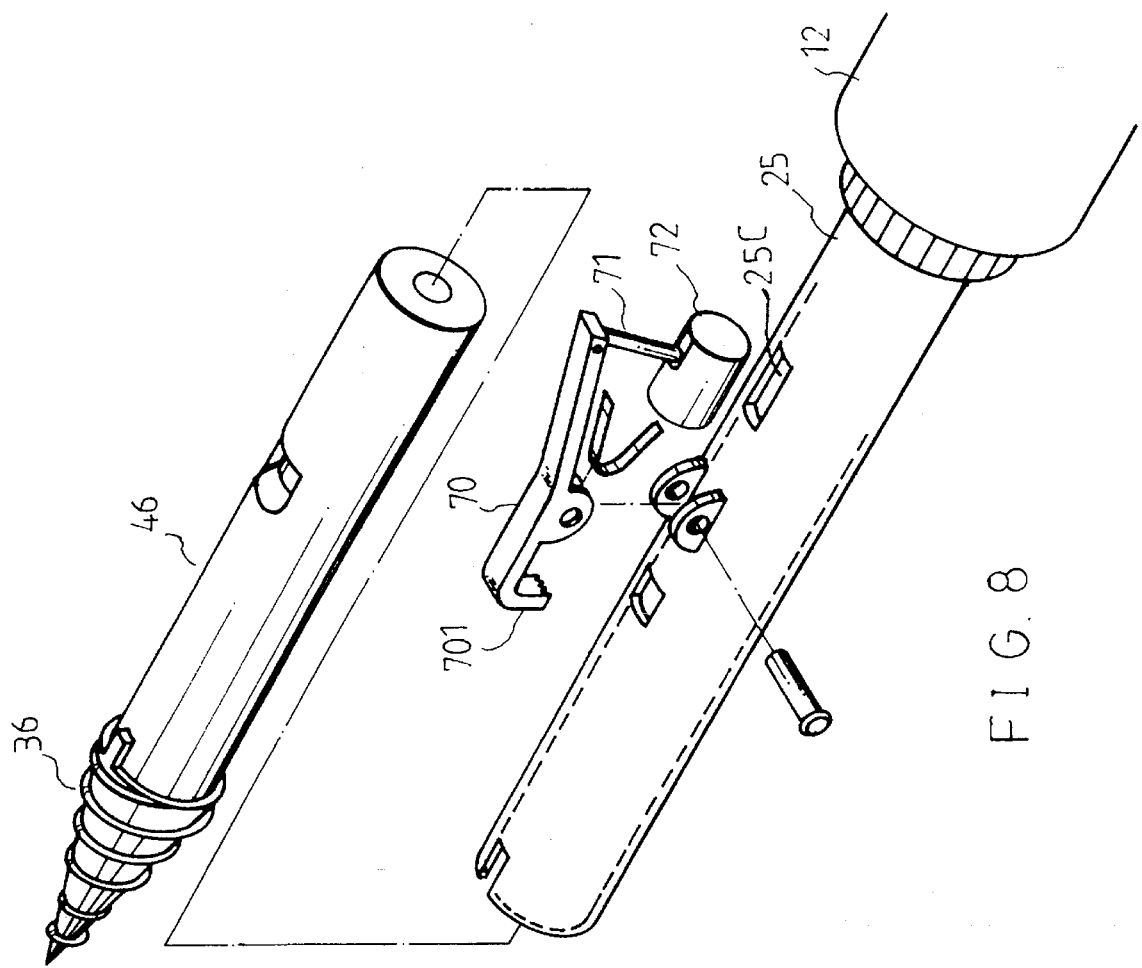
FIG. 8 is a perpective disassembled view of a sixth embodiment of the present invention.
Figure 9:
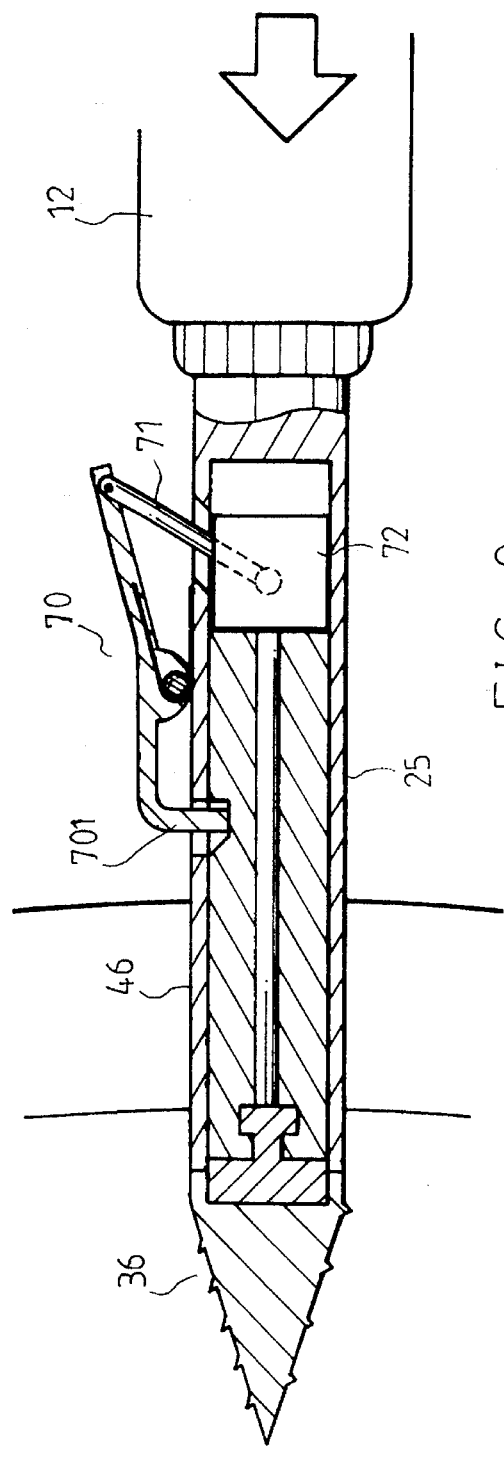
FIG. 9 is a side sectional view of the embodiment of FIG. 8 wherein the repair tool has penetrated a tire puncture.
Figure 10:
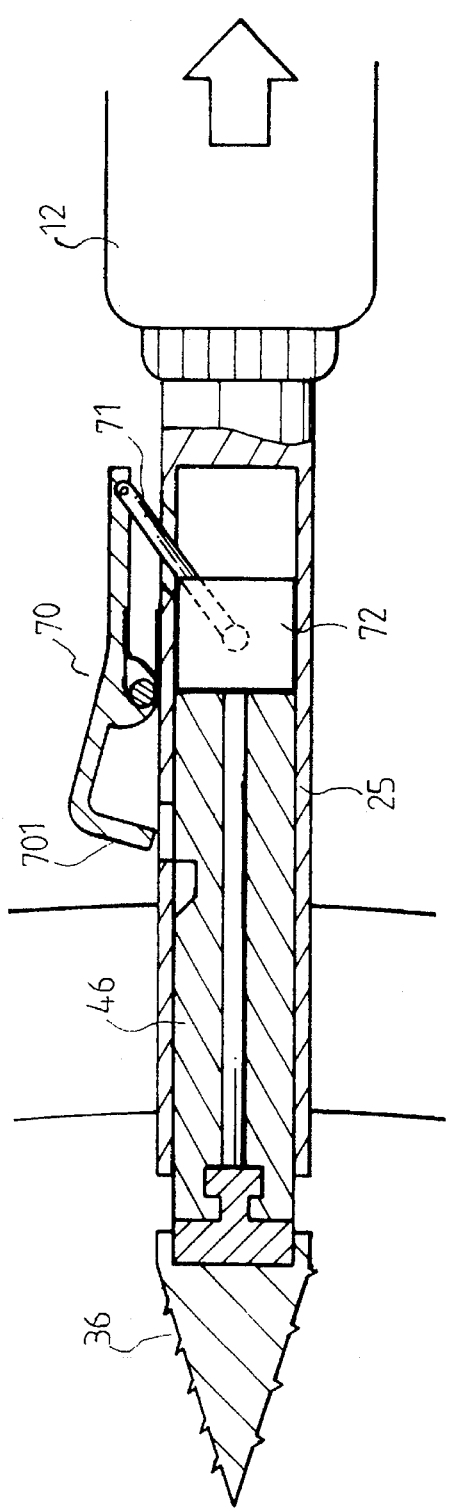
FIG. 10 is a side sectional view of the embodiment of FIG. 8 wherein the repair tool has penetrated a tire puncture and the penetrater and obturater have been displaced forward relative to the shank.
Figure 11:
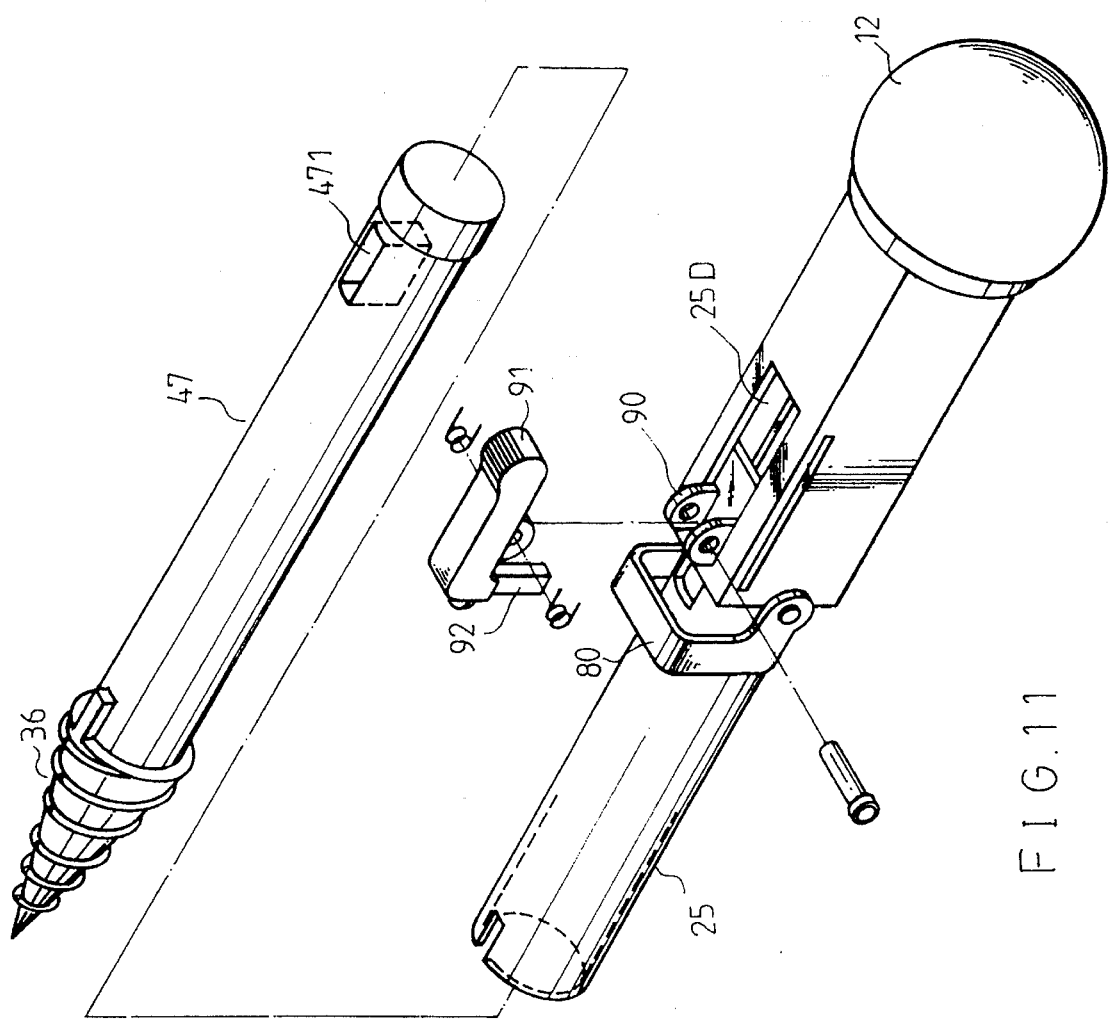
FIG. 11 is a perspective dissassembled view of a seventh embodiment of the present invention.
Figure 12:
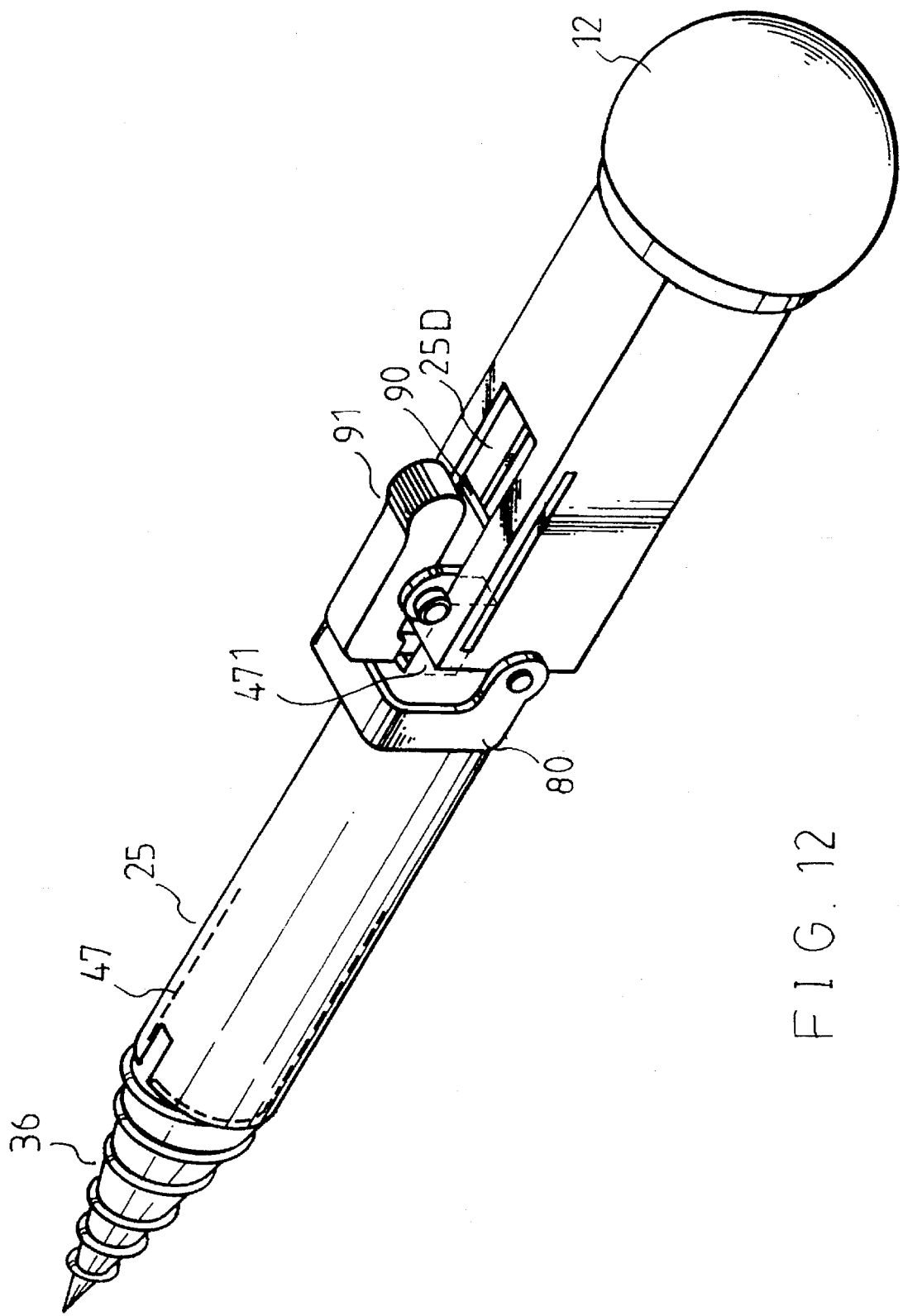
FIG. 12 is a side sectional view of the embodiment of FIG. 11 wherein an obturater thereof has been initially inserted into a shank.

FIGS. 8 to 10 show a sixth embodiment wherein the release and ejection of a penetrater 36 can be accomplished by a single action from the user. Therein, a lever 70 having a catch member 701 on its forward end similar to those of the previous two embodiments has a raised rear end portion to which a link 71 on one end thereof is hingedly connected. The link 71 extends through a slot 25c in the shank 25 and on the second end of the link 71 is pivotably connected a piston 72 which is slidingly disposed within the bore of the shank 25 adjacent the free end of the obturater 45. Depression of the rear end of lever 70 by a user releases the obturater 45 while concomitantly effecting the forward displacemnet of piston 72 via link 71 which displaces the obturater 45 forward and effects the separation of the penetrater 36 from the shank 25.

FIGS. 11 to 14 show a seventh embodiment of the present invention including an obturater 47 which has a rectangular slot recess 471, a hinged L-shaped latch 80 connected to the shank 25, and a slide member 90 having a lever 91 hingedly attached thereover. The shank 25 has an elongate rectangular slot 25d thereon of greater length than recess 471. The spring biased lever 91 has a catch bar 92 depending from the forward end thereof. When the obturater 47 is initially inserted into the shank 25 the recess 471 is adjacent the forward edge of slot, 25d while the ferruled end of obturater 47 is spaced from the rearward edge of the slot 25d. With the latch 80 swung to a non obstructing forward position and the slide member 90 slid to its forward limit, the lever 91 is released so as to intromit catch bar 92 into engagement with recess 471. The lever 91 is then slid to its rearward limit and the latch 80 rotated to a rearward position until in abutment with the forward end of the lever 91 so as to prevent forward displacement of the lever 91 upon release. This action elongates the resilient obturater 47 and secures the penetrater 36 over the end of the shank 25. To release and eject the penetrater 36, the latch 80 is once again swung forward and the slide member 90 allowed to move forwards to its forward limit, with the obturater 47 contracting to its original length. The lever 91 is then depressed so as to raise the catch bar 92 out from recess 471 and away from the shank 25, and slid rearwards to the limit of the slide member 90. The lever 91 is subsequently released whereat the catch bar 92 swings down into the space between the ferruled end of the obturater 47 and the rear edge of slot 25d, and then moved forward so as to displace the obturater 47 and move the penetrater 36 away from the end of the shank 25.

Though the above embodiments show a handle 12 for manual rotation of the tire puncture repair device, this should not be inferred as limiting the scope of the present invention to manually powered devices. Electrically or pneumatically powered repair devices employing the penetrater member 36 and attached obturater 47 of the present invention can also be readily implemented by a person of average skill in the art. Likewise, various modifications or variations of the mechanisms used for releasably securing and ejecting the penetrater member 36 and obturater 47 could also be so implemented, as such the actual spirit and scope of the present invention should not be construed from the above description but instead should be determined from the appended claims and their legal equivalents.

I claim:

1. A tire puncture repair device comprising:

an elongate cylindrical shank member having a central bore in a free end portion thereof;

a torque transmitting means fixed to a second end of said shank member;

a generally conical penetrater member having a helical thread formed therearound for boring through a tire puncture, said penetrater being mountable over the free end of said shank member;

a resilient elongate obturating member of predetermined length for obturating a tire puncture, said obturating member having a first end thereof fixed to a bottom of said penetrater, wherein said obturating member is disposed within the bore of said shank member when said penetrater member is mounted thereover;

coupling means for rotatingly coupling said penetrater member to said shank member when said penetrater member is mounted thereover so as to rotate therewith.

2. A tire puncture repair device as claimed in claim 1, wherein said coupling means comprises at least one axially aligned projection on the bottom of said penetrater member, and at least one cooperating notch on the free end of said shank member, each said at least one projection engaging a corresponding said at least one notch when said penetrater member is mounted on said shank member.

3. A tire puncture repair device as claimed in claim 2, wherein said penetrater member has a peripheral rim extending around the free end of said shank member.

4. A tire puncture repair device as claimed in claim 1, further comprising a retaining means for releasably securing said penetrater member over said shank member.

5. A fire puncture repair device as claimed in claim 4, further comprising an ejector means for displacing said penetrater member away from said shank member.

6. A tire puncture repair device as claimed in claim 5, wherein said retaining means comprises a peripheral stop recess on said obturating member proximate a second end thereof, and a hingedly supported catch member pivotably engageable with said stop recess.

7. A tire puncture repair device as claimed in claim 6, wherein said ejection means comprises a piston slidingly disposed within the bore of said shank member proximate the second end of said obturating member, wherein a forward displacement of said piston drives said obturating member in abutment therewith partially through the first end of said shank member and effects a separation of said penetrater member therefrom.

8. A tire puncture repair device as claimed in claim 6, wherein said ejection means comprises a central bore in said obturating member, and a rod slidingly disposed within the bore of said shank member and extending into the bore of said obturating member, wherein a forward displacement of said rod brings a terminal first end thereof into abutment with the base of said penetrater member and drives said penetrater member away from said shank member.

9. A tire puncture repair device as claimed in claim 6, wherein said retaining means further includes an elongation means for elongating said obturating member within the bore of said shank member.

10. A tire puncture repair device as claimed in claim 9, wherein said elongation means comprises a slide member connected to said catch member, wherein a rearward displacement of said slide member carries an engaged said catch member rearwards to elongate said obturating member.

11. A tire puncture repair device for inserting a resilient elongate obturating member of predetermined length through a puncture in a tire, said tire puncture repair device comprising:

an elongate cylindrical shank member having a central bore in a free end portion thereof;

a torque transmitting means fixed to a second end of said shank member;

a generally conical penetrater member having a helical thread formed therearound for boring through a tire puncture and an eyelet below a bottom thereof throughwhich said obturating member can be threaded and folded in half thereabout, said penetrater being mountable over the free end of said shank member whereat said obturating member is disposed within the bore of said shank member;

coupling means for rotatingly coupling said penetrater member to said shank member when said penetrater member is mounted thereover so as to rotate therewith.

12. A tire puncture repair device as claimed in claim 11, wherein said coupling means comprises at least one axially aligned projection on the bottom of said penetrater member, and at least one cooperating notch on the free end of said shank member, each said at least one projection engaging a corresponding said at least one notch when said penetrater member is mounted on said shank member.

13. A tire puncture repair device as claimed in claim 12, wherein said penetrater member has a peripheral rim extending around the free end of said shank member.

* * * * *